US012498819B2

(12) United States Patent
Yi et al.

(10) Patent No.: US 12,498,819 B2
(45) Date of Patent: Dec. 16, 2025

(54) DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Hong Yi, Beijing (CN); Tiaomei Zhang, Beijing (CN); Mengqi Wang, Beijing (CN); Wenbo Chen, Beijing (CN); Haigang Qing, Beijing (CN); Zhengkun Li, Beijing (CN); De Li, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/693,971

(22) PCT Filed: Dec. 27, 2021

(86) PCT No.: PCT/CN2021/141623
§ 371 (c)(1),
(2) Date: Mar. 21, 2024

(87) PCT Pub. No.: WO2023/122880
PCT Pub. Date: Jul. 6, 2023

(65) Prior Publication Data
US 2024/0393899 A1    Nov. 28, 2024

(51) Int. Cl.
*G06F 3/041*    (2006.01)

(52) U.S. Cl.
CPC ............ *G06F 3/04164* (2019.05); *G06F 2203/04107* (2013.01); *G06F 2203/04111* (2013.01)

(58) Field of Classification Search
CPC .................................................. G09G 3/006
See application file for complete search history.

(56) References Cited

U.S. PATENT DOCUMENTS

2001/0050747 A1* 12/2001 Hoshino ........... G02F 1/133753
                                                          349/149
2005/0127936 A1*  6/2005 Chen .................. G01R 27/205
                                                          324/760.01
(Continued)

FOREIGN PATENT DOCUMENTS

CN    108831910 A    11/2018
CN    110190103 A     8/2019
(Continued)

OTHER PUBLICATIONS

Written Opinion from PCT/CN2021/141623 dated Jul. 18, 2022.
International Search Report from PCT/CN2021/141623 dated Jul. 18, 2022.

*Primary Examiner* — Nan-Ying Yang
(74) *Attorney, Agent, or Firm* — Calfee, Halter & Griswold LLP

(57) ABSTRACT

A display panel and a display device are disclosed. The display panel includes display area and a peripheral area surrounding the display area. The peripheral area includes a first peripheral area located at a side of the display area, the first peripheral area has a cell test area for arranging a cell test unit, the display panel has a first edge, and the first edge is located at a side of the first peripheral area away from the display area. The display panel is provided with a reference (Continued)

power bus and a touch signal line, and in the first peripheral area, the reference power bus has a reference power bus protrusion.

19 Claims, 6 Drawing Sheets

(56) References Cited

U.S. PATENT DOCUMENTS

| | | | | |
|---|---|---|---|---|
| 2006/0145606 | A1* | 7/2006 | Lee | H10K 59/131 |
| | | | | 313/509 |
| 2020/0301535 | A1* | 9/2020 | Choi | H10K 59/40 |
| 2021/0036091 | A1* | 2/2021 | Kwak | H10K 59/131 |

FOREIGN PATENT DOCUMENTS

| | | |
|---|---|---|
| CN | 110690365 A | 1/2020 |
| CN | 113345933 A | 9/2021 |
| CN | 112905055 A | 7/2024 |

* cited by examiner

DISPLAY PANEL AND DISPLAY DEVICE

CROSS-REFERENCES TO RELATED APPLICATIONS

This application is a 371 application of PCT Application No. PCT/CN2021/141623 filed on Dec. 27, 2021, the contents of which are hereby incorporated in its entirety as a part of this application.

TECHNICAL FIELD

The present disclosure relates to the display technical field, and in particular, to a display panel and a display device.

BACKGROUND

In a flexible active-driven organic electroluminescent device (AMOLED, active-matrix organic light-emitting diode) touch integrated display panel, a touch signal line needs to be shielded with the help of a common electrode applied with a reference power voltage and a reference power bus to reduce crosstalk from other signals in the display panel on touch signal line.

It should be noted that the information disclosed in the background section is only for enhancing the understanding of the background of the present disclosure, and therefore may include information that does not constitute prior art known to those of ordinary skill in the art.

SUMMARY

The objective of the present disclosure is to overcome the above-mentioned shortcomings of the related art to provide a display panel and a display device, which can improve the flexibility in wiring of a touch signal line.

According to a first aspect of the present disclosure, there is provided a display panel, including a display area and a peripheral area surrounding the display area, wherein the peripheral area includes a first peripheral area located at a side of the display area, the first peripheral area has a cell test area for arranging a cell test unit, the display panel has a first edge, and the first edge is located at a side of the first peripheral area away from the display area;
  wherein the display panel is provided with a reference power bus and a touch signal line, and in the first peripheral area, the reference power bus has a reference power bus protrusion, and an orthographic projection of the reference power bus protrusion on the first edge is located within an orthographic projection of the cell test area on the first edge, and at least part of the touch signal line overlaps with the reference power bus protrusion.

According to an implementation of the present disclosure, the reference power bus protrusion is located at a side of the cell test unit close to the display area.

According to an implementation of the present disclosure, an end of the display area close to the cell test unit has an arc-shaped vertex angle;
  wherein the orthographic projection of the reference power bus protrusion on the first edge at least partially overlaps with an orthographic projection of the arc-shaped vertex angle on the first edge.

According to an implementation of the present disclosure, the display panel includes a pixel layer, the pixel layer has a common electrode layer for applying a reference power voltage, and the common electrode layer covers the display area;
  wherein an edge of the reference power bus protrusion away from the first edge is located between the display area and an edge of the common electrode layer close to the first edge.

According to an implementation of the present disclosure, an area where the reference power bus protrusion is located is a protrusion area, and at least part of the touch signal line is bent in the protrusion area.

According to an implementation of the present disclosure, the display panel is provided with a data line in the display area, and a first data interconnection line is provided between the display area and the cell test area;
  wherein the data line and the cell test unit are electrically connected through the first data interconnection line;
  wherein the reference power bus protrusion overlaps with at least part of the first data interconnection line.

According to an implementation of the present disclosure, the display panel is further provided with a driving power bus located in the first peripheral area;
  wherein the driving power bus includes a first part of the driving power bus, a third part of the driving power bus and a plurality of second parts of the driving power bus, and the first part of the driving power bus is located between the display area and the cell test area;
  wherein the third part of the driving power bus is located at a side of the cell test area away from the display area;
  wherein the cell test area includes a plurality of cell test sub-areas, the second parts of the driving power bus are located among the cell test sub-areas and are electrically connected to the first part of the driving power bus and the third part of the driving power bus.

According to an implementation of the present disclosure, the display panel is provided with at least one pad arranged along the first edge, and the at least one pad includes at least one driving power pad for applying a driving power voltage;
  wherein the driving power bus further includes at least one fourth part of the driving power bus, and the third part of the driving power bus is electrically connected to the at least one driving power pad through the at least one fourth part of the driving power bus.

According to an implementation of the present disclosure, the at least one driving power pad includes a plurality of driving power pads corresponding to ends of the third part of the driving power bus, and the at least one fourth part of driving power bus includes a plurality of fourth parts of the driving power bus corresponding one-to-one to the ends of the third part of the driving power bus;
  wherein the ends of the third part of the driving power bus are electrically connected to corresponding driving power pads through corresponding fourth parts of the driving power bus.

According to an implementation of the present disclosure, the third part of the driving power bus is divided into two power sub-lines, and an end of each of the power sub-lines is electrically connected with at least one driving power pad through at least one fourth part of the driving power bus.

According to an implementation of the present disclosure, a length of the first part of the driving power bus is less than a length of the third part of the driving power bus.

According to an implementation of the present disclosure, an orthographic projection of the first part of the driving power bus on the first edge does not overlap with the orthographic projection of the reference power bus protrusion on the first edge.

According to an implementation of the present disclosure, the display panel is further provided in the first peripheral area with a driving chip area for bonding a driving chip, and the first part of the driving power bus is provided between the driving chip area and the cell test area.

According to an implementation of the present disclosure, the display panel includes a base substrate, a driving layer, a pixel layer, a thin film encapsulation layer and a touch layer that are stacked in sequence;
wherein the touch signal line is provided in the touch layer;
wherein the driving layer includes a source-drain metal layer, and the driving power bus and the reference power bus are provided in the source-drain metal layer.

According to a second aspect of the present disclosure, there is provided a display device, including the above-mentioned display panel.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of the specification, illustrate embodiments consistent with the present disclosure and together with the specification serve to explain the principles of the present disclosure. Apparently, the drawings in the following description are only some embodiments of the present disclosure, and those skilled in the art may obtain other drawings according to these drawings without creative efforts.

DETAILED DESCRIPTION

Figure 1:
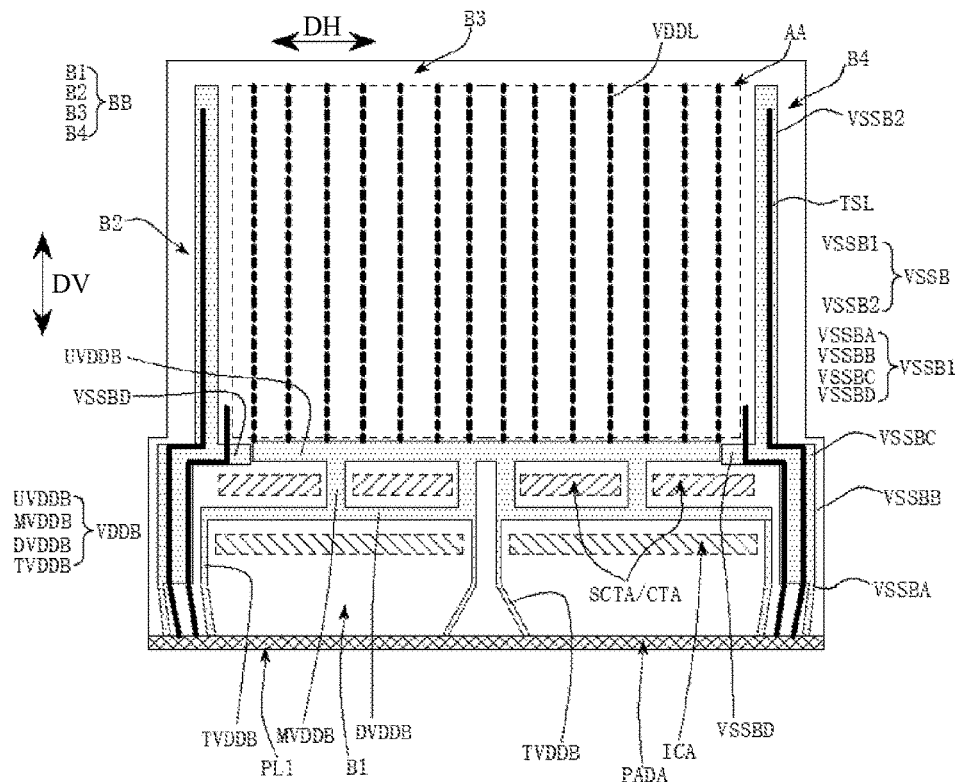
FIG. 1 is a schematic structural diagram of a display panel in an implementation of the present disclosure.

Example implementations will now be described more fully with reference to the accompanying drawings. Example implementations may, however, be embodied in many forms and should not be construed as being limited to the implementations set forth herein; rather, these implementations are provided so that the present disclosure will be thorough and complete, and will fully convey the concept of example implementations to those skilled in the art. The same reference numerals in the drawings denote the same or similar structures, and thus their repeated descriptions will be omitted. Furthermore, the drawings are merely schematic illustrations of the present disclosure and are not necessarily drawn to scale.

Although relative terms such as "upper" and "lower" are used in this specification to describe a relative relationship of one component in a drawing to another component, these terms are used in this specification only for convenience. For example, these relative terms are based on directions in examples in the drawings. It will be understood that if a device shown in a drawing is turned upside down, a component described as "upper" would become a component as "lower". When a structure is "on" another structure, it may mean that the structure is integrally formed on another structure, or that the structure is "directly" placed on another structure, or that the structure is "indirectly" placed on another structure through other structure(s).

The terms "one", "a/an", "the", "said" and "at least one" are used to indicate the presence of one or more elements/components/etc.; the terms "comprising/comprises/comprise" and "having/has/have" are used to indicate an open-ended inclusive, and means that there may be additional elements/components/etc. in addition to the listed elements/components/etc. The words "first", "second" and "third" are used as markers only, but are not used to limit the number of objects.

Figure 8:
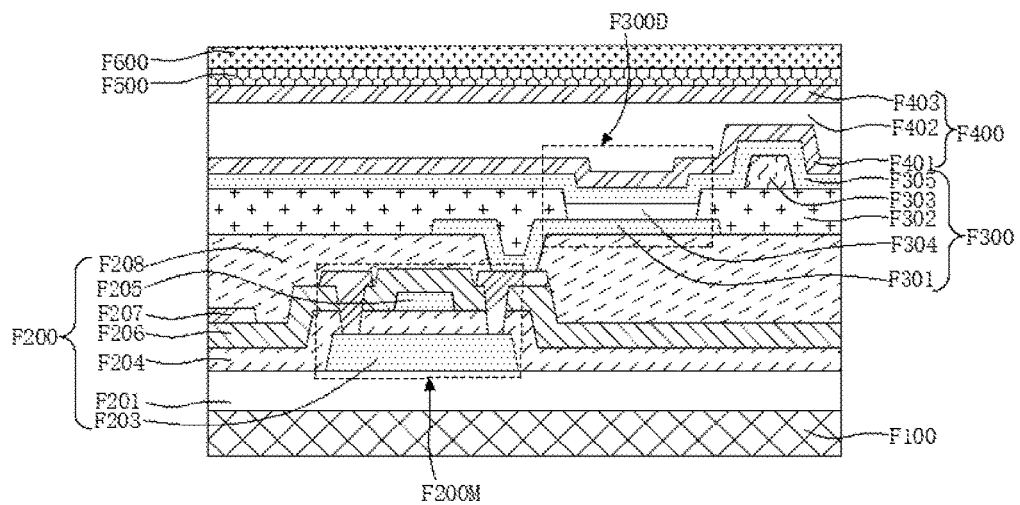
FIG. 8 is a schematic structural diagram of film layers of a display panel in an implementation of the present disclosure.

The present disclosure provides a display panel and a display device based on the display panel. Referring to FIG. 8, the display panel of the present disclosure includes a base substrate F100, a driving layer F200, a pixel layer F300, a thin film encapsulation layer F400 and a touch layer F500 that are stacked in sequence. The pixel layer F300 is provided with sub-pixels F300D for displaying a picture. The driving layer is provided with a pixel driving circuit for driving the sub-pixels. The touch layer F500 is provided with a touch electrode for sensing a touch action and a touch signal line TSL for transmitting a touch sensing signal. In this way, the display panel of the present disclosure can realize both display and touch functions.

In the present disclosure, when describing that a structure A overlaps with a structure B, it means that the structure A and structure B are located in different film layers, and there is an overlapping part between the orthographic projection of the structure A on the base substrate and the orthographic projection of the structure B on the base substrate.

A structural layer C being located at a side of a structural layer D away from the base substrate may be understood as that the structural layer C is formed at the side of the structural layer D away from the base substrate. When the structural layer D has a patterned structure, a part of the structure of the structural layer C may be located at the same physical height as the structural layer D or lower than the physical height of the structural layer D, where the base substrate is the height reference.

In an implementation of the present disclosure, the base substrate F100 may be a base substrate F100 of an inorganic material, or may be a base substrate F100 of an organic material. For example, in an implementation of the present disclosure, the material of the base substrate F100 may be a glass material such as soda-lime glass, quartz glass, sapphire glass, or may be a metal material such as stainless steel, aluminum, nickel, etc. In another implementation of the present disclosure, the material of the base substrate F100 may be polymethyl methacrylate (PMMA), polyvinyl alcohol (PVA), polyvinyl phenol (PVP), polyether sulfone (PES), polyimide, polyamide, polyacetal, polycarbonate (PC), polyethylene terephthalate (PET), polyethylene naphthalate (PEN) or combinations thereof. In another implementation of the present disclosure, the base substrate F100 may also be a flexible base substrate F100. For example, the material of the base substrate F100 may be polyimide (PI). Alternatively, the base substrate F100 may be a composite of multiple layers of materials. For example, in an implementation of the present disclosure, the base substrate F100 may include a bottom film, a pressure-sensitive adhesive layer, a first polyimide layer and a second polyimide layer that are stacked in sequence.

The driving layer F200 is provided with at least one pixel driving circuit configured to drive sub-pixels. In the driving layer F200, any pixel driving circuit may include a transistor F200M and a storage capacitor. Further, the transistor F200M may be a thin film transistor, and the thin film transistor may be selected from a top gate thin film transistor, a bottom gate thin film transistor, or a dual gate thin film transistor. The material of an active layer of the thin film transistor may be an amorphous silicon semiconductor material, a low temperature polysilicon semiconductor material, a metal oxide semiconductor material, an organic semiconductor material or other types of semiconductor materials. The thin film transistor may be an N-type thin film transistor or a P-type thin film transistor.

It can be understood that among the transistors in a pixel driving circuit, the types of any two transistors may be the same or different. For example, in an implementation, in a pixel driving circuit, some transistors may be N-type transistors and some transistors may be P-type transistors. As another example, in another implementation of the present disclosure, in a pixel driving circuit, the material of the active layer of some transistors may be a low temperature polysilicon semiconductor material, and the material of the active layer of some of the transistors may be a metal oxide semiconductor material. In some implementations of the present disclosure, the thin film transistors are low temperature polysilicon transistors. In other implementations of the present disclosure, some thin film transistors are low temperature polysilicon transistors, and some thin film transistors are metal oxide transistors.

Optionally, the driving layer F200 may include a semiconductor layer F203, a gate insulating layer F204, a gate layer F205, an interlayer dielectric layer F206, and a source-drain metal layer F207 and so on that are stacked between the base substrate F100 and the pixel layer F300. The thin film transistors and the storage capacitor may be formed by the semiconductor layer F203, the gate insulating layer F204, the gate layer F205, the interlayer dielectric layer F206, the source-drain metal layer F207 and so on. The positional relationships between the film layers may be determined according to the film layer structures of the thin film transistors. Further, the semiconductor layer F203 may be used to form a channel region of a transistor. The gate layer may be used to form gate layer lines such as scan lines, reset control lines, or light-emitting control lines, and may also be used to form a gate of a transistor, and may also be used to form part or all of electrode plates of the storage capacitor. The source-drain metal layer may be used to form source-drain metal layer lines such as data lines for applying driving data, or driving power lines for applying a driving power voltage, and may also be used to form part of the electrode plates of the storage capacitor.

For example, in some implementations of the present disclosure, the driving layer F200 may include a semiconductor layer F203, a gate insulating layer F204, a gate layer F205, an interlayer dielectric layer F206 and a source-drain metal layer F207 that are stacked in sequence, and the thin film transistor formed in this way is a top gate thin film transistor.

For another example, in some implementations of the present disclosure, the driving layer F200 may include a gate layer F205, a gate insulating layer F204, a semiconductor layer F203, an interlayer dielectric layer F206 and a source-drain metal layer F207 that are stacked in sequence, and the thin film transistor formed in this way is a bottom gate thin film transistor.

In some implementations, the gate layer may be two layers or three layers. For example, in an implementation of the present disclosure, the gate layer F205 may include a first gate layer and a second gate layer. The gate insulating layer F204 may include: a first gate insulating layer for isolating the semiconductor layer F203 and the first gate layer; and a second gate insulating layer for isolating the first gate layer and the second gate layer. For example, the driving layer F200 may include a semiconductor layer F203, a first gate insulating layer, a first gate layer, a second gate insulating layer, a second gate layer, an interlayer dielectric layer F206 and a source-drain metal layer F207 that are stacked in sequence at a side of the base substrate F100. For another example, in an implementation of the present disclosure, the gate layer F205 may include a first gate layer and a second gate layer. The semiconductor layer F203 may be sandwiched between the first gate layer and the second gate layer. The gate insulating layer F204 may include: a first gate insulating layer for isolating the semiconductor layer F203 and the first gate layer; and a second gate insulating layer for isolating the second gate layer and the semiconductor layer F203. For example, in an implementation of the present disclosure, the driving layer F200 may include a first gate layer, a first gate insulating layer, a semiconductor layer F203, a second gate insulating layer, a second gate layer, an interlayer dielectric layer F206 and a source-drain metal layer F207 that are stacked in sequence at a side of the base substrate F100. In this way, a transistor with a double-gate structure may be formed. For another example, in an implementation of the present disclosure, the semiconductor layer F203 may include a low temperature polysilicon semiconductor layer and a metal oxide semiconductor layer. The gate layer includes a first gate layer and a second gate layer. The gate insulating layer includes first and second gate insulating layers. The driving layer F200 may include a low temperature polysilicon semiconductor layer, a first gate insulating layer, a first gate layer, a metal oxide semiconductor layer, a second gate insulating layer, a second gate layer, an interlayer dielectric layer F206 and a source-drain metal layer F207 that are stacked in sequence at a side of the base substrate F100. For another example, in an implementation of the present disclosure, the semiconductor layer F203 may include a low temperature polysilicon semiconductor layer and a metal oxide semiconductor layer. The gate layer includes first to third gate layers. The gate insulating layer includes first to third gate insulating layers. The driving layer F200 may include a low temperature polysilicon semiconductor layer, a first gate insulating layer, a first gate layer, an insulating buffer layer, a second gate layer, a second gate insulating layer, a metal oxide semiconductor layer, a third gate insulating layer, a third gate layer, an interlayer dielectric layer F206 and a source-drain metal layer F207 that are stacked in sequence at a side of the base substrate F100.

In some implementations, the source-drain metal layer may be two layers or three layers. For example, in an implementation of the present disclosure, the source-drain metal layer may include a first source-drain metal layer and a second source-drain metal layer that are stacked in sequence at a side of the interlayer dielectric layer F206 away from the base substrate. An insulating layer, such as a passivation layer and/or a planarization layer, may be sandwiched between the first source-drain metal layer and the second source-drain metal layer. For another example, in an implementation of the present disclosure, the source-drain metal layer may include a first source-drain metal layer, a second source-drain metal layer and a third source-drain metal layer that are stacked in sequence at a side of the interlayer dielectric layer F206 away from the base substrate. An insulating layer, such as a passivation layer and/or a resin layer, may be sandwiched between the first source-drain metal layer and the second source-drain metal layer. An insulating layer, such as a passivation layer and/or a planarization layer, may be sandwiched between the second source-drain metal layer and the third source-drain metal layer.

Optionally, the driving layer F200 may further include a passivation layer, and the passivation layer may be provided on a surface of the source-drain metal layer F207 away from the base substrate F100 to protect the source-drain metal layer F207.

Optionally, the driving layer F200 may further include a buffer material layer F201 arranged between the base substrate F100 and the semiconductor layer F203, and the semiconductor layer F203, and the gate layer F205, etc. are located at a side of the buffer material layer away from the base substrate F100. The material of the buffer material layer may be an inorganic insulating material such as silicon oxide or silicon nitride. The buffer material layer may be one layer of inorganic material, or may be multiple layers of laminated inorganic materials.

Optionally, the driving layer F200 may further include a planarization layer F208 located between the source-drain metal layer F207 and the pixel layer F300. The planarization layer F208 may provide a planarized surface for pixel electrode(s). Optionally, the material of the planarization layer F208 may be an organic material.

The pixel layer is provided with sub-pixels distributed in an array, and each sub-pixel emits light under the control of a pixel driving circuit. In the present disclosure, a sub-pixel may be an organic electroluminescent diode (OLED), a micro light emitting diode (LED), a quantum dot-organic electroluminescent diode (QD-OLED), a quantum dot light emitting diode (QLED), or other types of light-emitting devices. For example, in an implementation of the present disclosure, the sub-pixel is an organic electroluminescent diode (OLED), and the display panel is an OLED display panel. In the following description, taking the sub-pixel being an organic electroluminescent diode as an example, a feasible structure of the pixel layer is introduced as an example.

Optionally, the pixel layer F300 may be arranged at a side of the driving layer F200 away from the base substrate F100, and may include a pixel electrode layer F301, a pixel definition layer F302, a support pillar layer F303, an organic light-emitting functional layer F304 and a common electrode layer F305 that are stacked in sequence. The pixel electrode layer F301 has multiple pixel electrodes in the display area of the display panel. The pixel definition layer F302 has multiple through pixel openings in the display area that are arranged in one-to-one correspondence with the multiple pixel electrodes. Any one pixel opening exposes at least part of a corresponding pixel electrode. The support pillar layer F303 includes a plurality of support pillars in the display area, and the support pillars are located on a surface of the pixel definition layer F302 away from the base substrate F100 to support a fine metal mask (FMM) during an evaporation process. The organic light-emitting functional layer F304 covers at least the pixel electrodes exposed by the pixel defining layer F302. The organic light-emitting functional layer F304 may include an organic electroluminescent material layer, and may include one or more of a hole injection layer, a hole transport layer, an electron blocking layer, a hole blocking layer, an electron transport layer and an electron injection layer. Each layer of the organic light-emitting functional layer F304 may be prepared through an evaporation process, and a fine metal mask or an open mask may be used to define the pattern of each layer during evaporation. The common electrode layer F305 may cover the organic light-emitting functional layer F304 in the display area. In this way, a pixel electrode, the common electrode layer F305 and the organic light-emitting functional layer F304 located between the pixel electrode and the common electrode layer F305 form an organic electroluminescent diode F300D. Any organic electroluminescent diode may be used as a sub-pixel of the display panel. When a pixel driving circuit works, the source of its driving transistor may be applied with a driving power voltage, the gate of the driving transistor may be applied with a voltage related to a data voltage, and the drain of the driving transistor may be electrically connected with the pixel electrode of the sub-pixel. The common electrode of the sub-pixel may be applied with a reference power voltage as the common electrode voltage. The driving transistor outputs a driving current under the control of the voltage on its gate, and the sub-pixel emits light under the driving of the driving current.

In some implementations, the pixel layer F300 may further include a light extraction layer located at a side of the common electrode layer F305 away from the base substrate F100 to enhance the light extraction efficiency of the organic light emitting diode.

Optionally, the display panel may further include a thin film encapsulation layer F400. The thin film encapsulation layer F400 is provided on a surface of the pixel layer F300 away from the base substrate F100, and may include an inorganic encapsulation layer and an organic encapsulation layer that are alternately stacked. The inorganic encapsulation layer can effectively block external moisture and oxygen, preventing water and oxygen from invading the organic light-emitting functional layer F304 which may cause material degradation. Optionally, an edge of the inorganic encapsulation layer may be located in the peripheral area. The organic encapsulation layer is located between two adjacent inorganic encapsulation layers to achieve planarization and reduce stress between the inorganic encapsulation layers. An edge of the organic encapsulation layer may be located between the edge of the display area and the edge of the inorganic encapsulation layer(s). Exemplarily, the thin film encapsulation layer F400 includes a first inorganic encapsulation layer F401, an organic encapsulation layer F402 and a second inorganic encapsulation layer F403 that are sequentially stacked at a side of the pixel layer F300 away from the base substrate F100.

Figure 9:
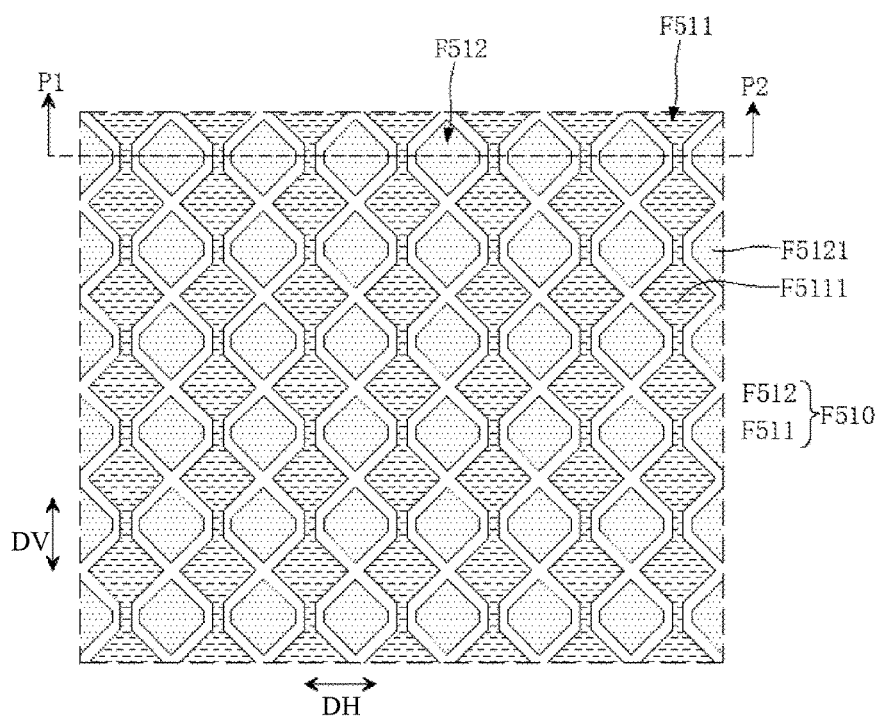
FIG. 9 is a schematic structural diagram of a touch electrode of a touch layer of a display panel in an implementation of the present disclosure.
Figure 10:
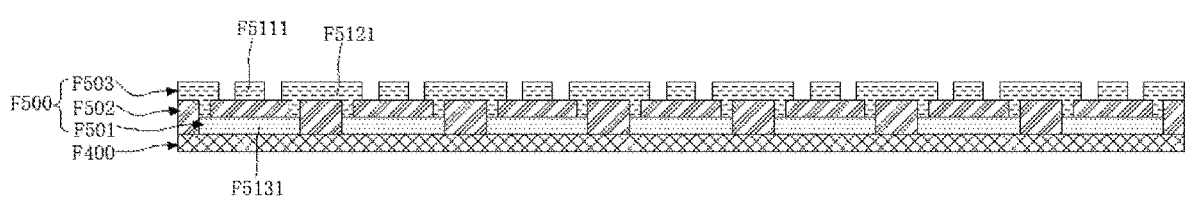
FIG. 10 is a schematic structural diagram of the touch layer cut along a P1P2 direction in FIG. 9.

The touch layer F500 is provided at a side of the thin film encapsulation layer F400 away from the base substrate F100, and is used to implement the touch operation of the display panel. Referring to FIG. 9 and FIG. 10, the touch layer F500 may include a first touch metal layer F501, a touch insulating layer F502, and a second touch metal layer F503 that are stacked in sequence. The second touch metal layer F503 is located at a side of the first touch metal layer F501 away from the base substrate F100. One or two layers of the first touch metal layer F501 and the second touch metal layer F503 are used to form the touch electrode F510. In an implementation of the present disclosure, the touch layer F500 is arranged at a side of the thin film encapsulation layer F400 away from the base substrate.

Optionally, a touch buffer layer may further be included between the first touch metal layer F501 and the thin film encapsulation layer F400. The material of the touch buffer layer may be an inorganic material, such as silicon nitride, silicon oxide, or silicon oxynitride, or the like. It can be understood that in other implementations of the present disclosure, the outermost inorganic encapsulation layer of the thin film encapsulation layer F400 may also be reused as a touch buffer layer.

Optionally, a touch protection layer may also be included at a side of the second touch metal layer F503 away from the base substrate F100. The material of the touch protection layer may be an inorganic material, such as silicon nitride, silicon oxide, or silicon oxynitride, or the like. It can be understood that in other implementations of the present disclosure, the side of the second touch metal layer F503 away from the base substrate F100 may also be directly provided with an organic layer, such as an organic cover plate or optical adhesive.

Optionally, the first touch metal layer F501 and the second touch metal layer F503 may be light-transmitting film layers, so that the formed touch electrode F510 is a transparent electrode. In an implementation of the present disclosure, the materials of the first touch metal layer F501 and the second touch metal layer F503 may be a light-transmitting material, such as a transparent conductive metal oxide (such as indium tin oxide, etc.).

The shape and position of the touch electrode F510 may be set according to the needs of the touch display panel, as long as the touch layer F500 can determine a touch position based on a self-capacitance or mutual capacitance principle. The touch layer F500 may also be used to form a touch line to deliver a signal generated by the touch electrode F510 in response to a touch action.

For example, in an implementation of the present disclosure, referring to FIG. 10, touch electrodes F510 include a plurality of row touch electrodes F512 extending along a row direction H1 and a plurality of column touch electrodes F511 extending along a column direction H2. The row touch electrodes F512 are arranged in sequence along the column direction H2. The column touch electrodes F511 are arranged in sequence along the row direction H1. Any column touch electrode F511 is arranged in the second touch metal layer F503 and includes a plurality of column touch sub-electrodes F5111 arranged sequentially along the column direction H2. Ends of two adjacent column touch sub-electrodes F5111 are connected with each other. In this way, the column touch electrodes F511 are completely arranged in the second touch metal layer F503. Any row touch electrode F512 includes a plurality of row touch sub-electrodes F5121 arranged sequentially along the row direction H1. The row touch sub-electrodes F5121 are arranged in the second touch metal layer F503, and their edges are adjacent to edges of the column touch sub-electrodes F5111. In any one row touch electrode F512, two adjacent row touch sub-electrodes F5121 are separated by a column touch electrode F511, and two adjacent row touch sub-electrodes F5121 are connected by a bridge connection portion F5131 in the first touch metal layer F501.

For another example, in another implementation of the present disclosure, the touch electrodes include a plurality of row touch electrodes extending in the row direction and a plurality of column touch electrodes extending in the column direction. The row touch electrodes are arranged in sequence along the column direction, and the column touch electrodes are arranged in sequence along the row direction. Any one of the row touch electrodes is arranged in the second touch metal layer and includes a plurality of row touch sub-electrodes arranged sequentially along the row direction, and ends of two adjacent row touch sub-electrodes are connected to each other. In this way, the row touch electrodes are completely arranged in the second touch metal layer. Any one of the column touch electrodes includes a plurality of column touch sub-electrodes arranged sequentially along the column direction. The column touch sub-electrodes are arranged in the second touch metal layer, and their edges are arranged adjacent to edges of row touch sub-electrodes. In any one of the column touch electrodes, two adjacent column touch sub-electrodes are separated by a row touch electrode, and two adjacent column touch sub-electrodes are connected through a bridge connection arranged in the first touch metal layer.

For another example, in another implementation of the present disclosure, the touch electrodes include a plurality of row touch electrodes extending along the row direction and a plurality of column touch electrodes extending along the column direction. The row touch electrodes are arranged in sequence along the column direction, and the column touch electrodes are arranged in sequence along the row direction. One of the row touch electrodes and the column touch electrodes is arranged in the first touch metal layer, and the other one of the row touch electrodes and the column touch electrodes is arranged in the second touch metal layer. In this way, the row touch electrodes and the column touch electrodes overlap with each other and form mutual capacitance. When the touch layer is pressed by a touch object such as a finger, the mutual capacitance between the row touch electrodes and the column touch electrodes changes.

For another example, in another implementation of the present disclosure, the touch electrodes are distributed as an array in the second touch metal layer, and the touch line extends through the first touch metal layer to be connected with the touch electrodes through via holes.

Optionally, the display panel may further include an anti-reflection layer F600. The anti-reflection layer F600 may be arranged at a side of the thin film encapsulation layer F400 away from the pixel layer F300 to reduce the reflection of ambient light by the display panel, thereby reducing the influence of ambient light on the display effect.

For example, the anti-reflection layer F600 may include a color filter layer and a black matrix layer which are stacked. This can reduce ambient light interference while improve light purity to increase the color gamut of the display panel. Further, the anti-reflection layer F600 is provided between the thin film encapsulation layer and the touch layer.

As another example, the anti-reflection layer F600 may be a polarizer, such as a patterned coated circular polarizer. Further, the anti-reflection layer F600 may be arranged at a side of the touch layer F500 away from the base substrate F100.

FIG. 1 is a schematic top structural view of a display panel in an implementation of the present disclosure. Referring to FIG. 1, the display panel of the present disclosure includes a display area AA and a peripheral area BB surrounding the display area AA. In the display area AA, the display panel is provided with sub-pixels and at least one pixel driving circuit for driving the sub-pixels, and the display panel is also provided with lines for applying signals to the at least one pixel driving circuit or receiving feedback signals from the at least one pixel driving circuit. These lines may include row lines extending along a row direction DH, for example including one or more of: scan lines for applying scan signals, light-emitting control lines for applying light-emitting control signals, reset control lines for applying reset control signals, initialization lines for applying an initialization voltage, or may include other required line(s). These lines may also include column lines extending along a column direction DV, including, for example, data lines for applying driving data, driving power lines VDDL for applying a driving power voltage, etc.

Referring to FIG. 1, the peripheral area BB may include a first peripheral area B1, a second peripheral area B2, a third peripheral area B3 and a fourth peripheral area B4 that are connected in sequence. The first peripheral area B1 and the third peripheral area B3 are respectively located at opposite sides of the display area AA and extend along the row direction DH. In other words, the first peripheral area B1, the display area AA and the third peripheral area B3 are arranged in sequence along the column direction. The second peripheral area B2 and the fourth peripheral area B4 are respectively located on opposite sides of the display area AA and extend along the column direction DV. In other words, the second peripheral area B2, the display area AA and the fourth peripheral area B4 are arranged in sequence along the row direction. An outer edge of the first peripheral area B1 (i.e., an edge of the first peripheral area B1 away from the display area AA) may be defined as a first edge PL1. In other words, the display panel has a first edge PL1, and the first peripheral area B1 is located between the first edge PL1 and the display area AA. The display panel may be provided with a pad area PADA extending along the first edge PL1. The pad area PADA is provided with a plurality of pads arranged along the first edge PL1 for bonding and connection with an external circuit, such as bonding and connection with a flexible circuit board, a chip-on-film, a printed circuit board or other circuit structure. The display device of the present disclosure (such as a mobile phone screen, a tablet computer, a notebook computer, an interactive electronic billboard or other devices using the display panel of the present disclosure) has a controller, and the controller may be used as an external circuit for the display panel to be bonded and connected with the pads in the pad area PADA.

In the present disclosure, for convenience of description, an end close to the first edge PL1 may be called a near-end of the display panel, an end close to the third peripheral area B3 may be called a far-end of the display panel, a side close to the second peripheral area B2 is defined as a left side, and a side close to the fourth peripheral area B4 is defined as a right side. It can be understood that the "far-end", "near-end", "right side" and "left side" in the present disclosure are relative concepts rather than their usual meanings, and are used to express relative positional relationships between various structures, rather than absolute positional relationships.

Referring to FIG. 3 to FIG. 6, the first peripheral area B1 has a cell test area CTA in which a cell test unit CT is provided, and a first data interconnection line D1L provided between the cell test area CTA and the display area AA. A data line is electrically connected to a cell test unit CT through the first data interconnection line D1L. In this way, during a cell test stage of the display panel in preparation process, the cell test unit CT may perform a cell test on the display panel, for example, detecting defects such as whether there is a bright dot, whether there is a color spot, whether there is a stain, or whether there is a bright line.

Figure 2:
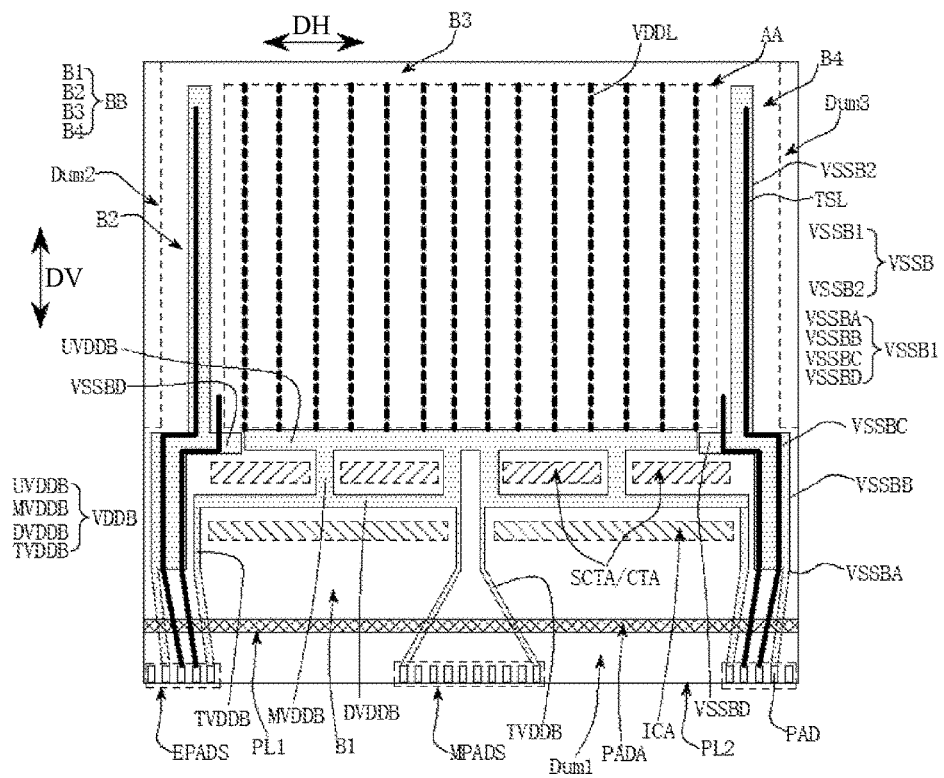
FIG. 2 is a schematic structural diagram of an intermediate module in an implementation of the present disclosure.
Figure 3:
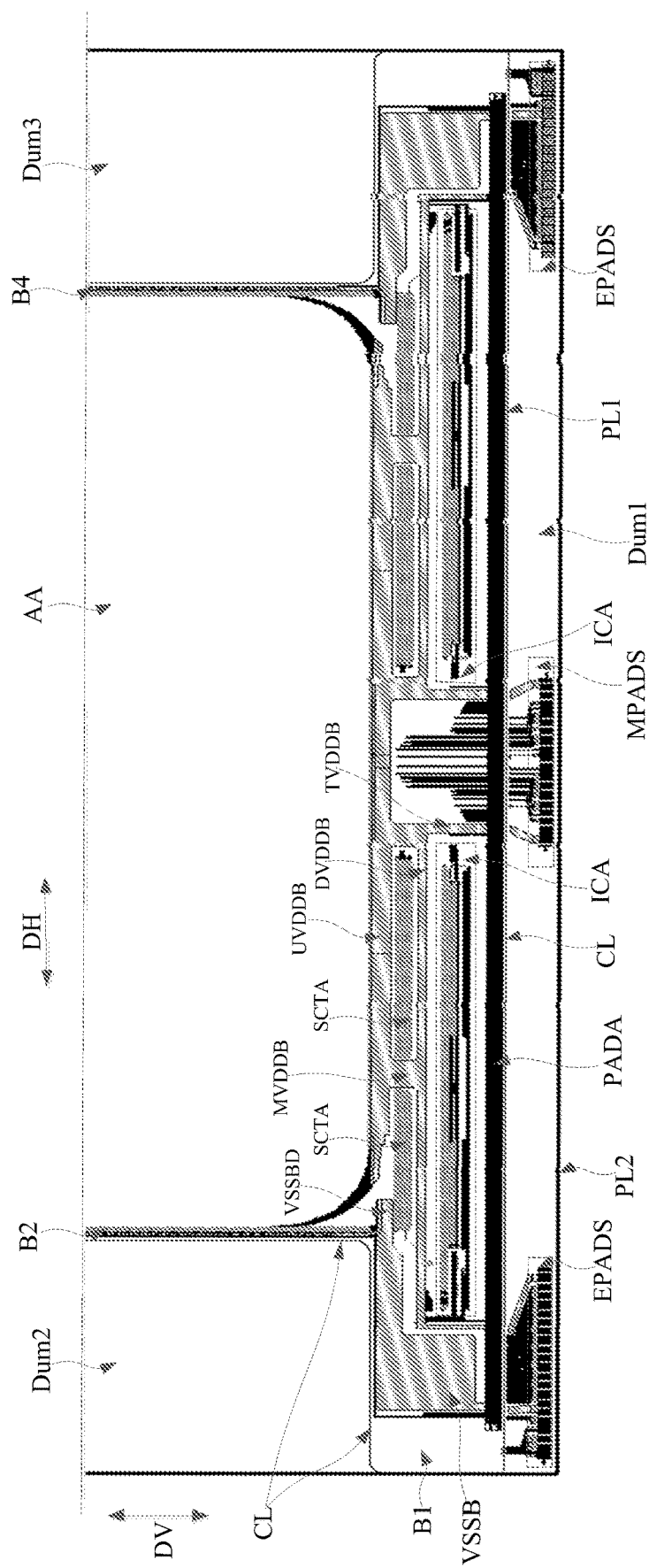
FIG. 3 is a schematic structural diagram of a source-drain metal layer of an intermediate module at a near-end in an implementation of the present disclosure.

The display panel may be presented as an intermediate module during the preparation process. FIG. 2 and FIG. 3 illustrate a schematic structural diagram of an intermediate module. Compared with the display panel, the intermediate module has one or more auxiliary areas, which may be cut off during a cutting stage. In one example, referring to FIG. 2 and FIG. 3, the intermediate module includes a first auxiliary area Dum1 located at a side of the first peripheral area B1 away from the display area AA, a second auxiliary area Dum2 located at a side of the second peripheral area B2 away from the display area AA, and a third auxiliary area Dum3 located at a side of the fourth peripheral area B4 away from the display area AA. When cutting these auxiliary areas, the cutting may be performed along a cutting line CL. Referring to FIG. 2 and FIG. 3, before cutting, an edge at the near-end side of the intermediate module is a second edge PL2, and the second edge PL2 is located at a side of the first auxiliary area Dum1 away from the display area AA. Referring to FIG. 2 and FIG. 3, the first auxiliary area Dum1 is provided with at least one contact pad PAD arranged along the second edge PL2. During the cell test stage, a probe of a detection device may be pressed on the contact pad PAD to apply a detection signal to the intermediate module. During the cutting stage, these contact pads PAD may be cut off. It can be understood that in other implementations of the present disclosure, the intermediate module may have other auxiliary areas or fewer auxiliary areas, for example, the intermediate module may have only the first auxiliary area Dum1 without the second auxiliary area Dum2 and the third auxiliary area Dum3.

In an implementation of the present disclosure, the cell test unit CT may include one or more rows of detection transistors. An input terminal of a detection transistor is used to apply a detection signal or driving data. A gate of the detection transistor is electrically connected to a detection control line, and an output terminal of the detection transistor is electrically connected to a data line through a first data interconnection line D1L.

In an implementation of the present disclosure, the first data interconnection line D1L is provided in the gate layer, for example, provided in one or two layers of a first gate layer and a second gate layer.

Referring to FIG. 1, the display panel is provided with a reference power bus VSSB for applying a reference power voltage and a driving power bus VDDB for applying a driving power voltage in the peripheral area BB. In some implementations, the reference power bus VSSB and the driving power bus VDDB may be arranged in the source-drain metal layer.

Referring to FIG. 1, there may be two reference power buses VSSB which are at the left and right sides, so as to provide the reference power voltage to the common electrode layer through the second peripheral area B2 and the fourth peripheral area B4 respectively. Specifically, a reference power bus VSSB includes a reference power wiring segment VSSB1 located in the first peripheral area B1 and a reference power supplying segment VSSB2 located in the second peripheral area B2 or the fourth peripheral area B4. The reference power wiring segment VSSB1 is located at an end of the first peripheral area B1, for example, is provided at the left end or the right end of the first peripheral area B1. The near-end of the reference power wiring segment VSSB1 is electrically connected to a reference power pad in the pad area PADA. The far-end of the reference power wiring segment VSSB1 is electrically connected to the reference power supplying segment VSSB2. The common electrode layer covers the display area AA and extends into the second peripheral area B2 and the fourth peripheral area B4, and is electrically connected to the reference power supplying segment VSSB2 through a via hole.

Referring to FIG. 1, the driving power bus VDDB is provided in the first peripheral area B1 and is between two reference power buses VSSB. The driving power bus VDDB may directly supply power to a driving power line VDDL of the display area AA from the first peripheral area B1. In other words, the driving power bus VDDB is at least partially arranged between the cell test area CTA and the display area AA, and is directly electrically connected to at least part of the driving power lines VDDL.

Referring to FIG. 1, at least part of the touch signal line TSL of the touch layer may be arranged in the peripheral area BB, for example, the touch signal line TSL is routed from the second peripheral area B2 and the fourth peripheral area B4 to the first peripheral area B1 respectively, so as to be electrically connected to a driving chip or an external circuit in the first peripheral area B1. When routing the touch signal line TSL, it may overlap with the reference power bus VSSB or the common electrode layer to achieve signal shielding, ensuring the stability of a touch sensing signal on the touch signal line TSL and reducing the crosstalk from other signals in the display panel on the touch signal line TSL.

In the related art, the driving power bus VDDB is completely arranged between the cell test area CTA and the display area AA, and its orthographic projection on the first edge PL1 completely covers the orthographic projection of the cell test unit CT on the first edge PL1. The reference power wiring segment VSSB1 needs to avoid the driving power bus VDDB during wiring, that is, the orthographic projection of the reference power wiring segment VSSB1 on the first edge PL1 does not overlap with the orthographic projection of the cell test unit CT on the first edge PL1. However, this arrangement results in a relatively small width of the reference power wiring segment VSSB1 in the row direction, which results in that the touch signal line TSL needs to maintain a small line width in order to overlap with the reference power wiring segment VSSB1 to realize signal shielding. This is not conducive to increasing the number of touch signal lines TSL (and thus increasing the number of touch electrodes) to improve touch accuracy, nor is it conducive to increasing the width of the touch signal lines TSL to reduce a voltage drop of the touch sensing signal.

Referring to FIG. 1, in the display panel provided by the present disclosure, in the first peripheral area B1, the reference power bus VSSB has a reference power bus protrusion VSSBD. The orthographic projection of the reference power bus protrusion VSSBD on the first edge PL1 is located within the orthographic projection of the cell test area CTA on the first edge PL1. In other words, the reference power wiring segment VSSB1 is provided with a reference power bus protrusion VSSBD that may extend to the inside of the first peripheral area B1 (the middle side of the first peripheral area B1 in the row direction) to increase the width of the reference power wiring segment VSSB1. At least part of the touch signal line(s) TSL overlaps with the reference power bus protrusion VSSBD to perform signal shielding through the reference power bus protrusion VSSBD. In this way, the display panel of the present disclosure can increase the width of the touch signal line(s) TSL so that part of the touch signal line(s) TSL overlaps with the reference power bus protrusion VSSBD, and can also increase the number of touch signal line(s) TSL to make part of the touch signal line(s) TSL overlap with the reference power bus protrusion VSSBD. These manners overcome the constraints on the touch signal line(s) TSL due to the small width of the reference power wiring segment VSSB1, and can improve the touch accuracy or touch precision, and improve the flexibility in wiring of the touch signal line(s) TSL.

Referring to FIG. 1, in an implementation of the present disclosure, the reference power bus protrusion VSSBD is located at a side of the cell test area CTA close to the display area AA. In this way, the reference power bus protrusion VSSBD and the common electrode layer can be as close as possible or even overlapped in the first peripheral area B1, reducing or eliminating the gap between the reference power bus protrusion VSSBD and the common electrode layer, thereby making the reference power bus protrusion VSSBD have a better signal shielding capability.

In one example, an edge of the reference power bus protrusion VSSBD away from the first edge PL1 is between the display area AA and an edge of the common electrode layer close to the first edge PL1. In other words, there may be no gap between the reference power bus protrusion VSSBD and the common electrode layer. In this way, the touch signal line TSL extends along the column direction to a path that overlaps with the reference power bus protrusion VSSBD, and it may overlap with the common electrode layer and the reference power bus protrusion VSSBD in sequence to obtain better signal shielding.

In one example, the reference power bus protrusion VSSBD overlaps at least part of the first data interconnection line D1L. In this way, the reference power bus protrusion VSSBD may shield at least part of the first data interconnection line D1L, reducing or eliminating the crosstalk of the first data interconnection line D1L on the touch signal line(s) TSL.

In an implementation of the present disclosure, referring to FIG. 3, an end of the display area AA close to the cell test unit CT has an arc-shaped vertex angle. The orthographic projection of the reference power bus protrusion VSSBD on the first edge PL1 at least partially overlaps with the orthographic projection of the arc-shaped vertex angle on the first edge PL1. In the related art, the part of the first peripheral area B1 close to the arc-shaped vertex angle cannot be provided with a common electrode layer, nor can there be wiring of a reference power bus VSSB; this makes a side of the touch signal line TSL at the near-end side of the arc-shaped vertex angle cannot obtain signal shielding and there is a great risk of crosstalk. In this implementation, the reference power bus protrusion VSSBD is inserted between the arc-shaped vertex angle and the cell test unit CT, which overcomes the defect of the lack of shielding on the touch signal line TSL in this area and ensures that the stability of the sensing signal on touch signal line TSL.

In an implementation of the present disclosure, the area where the reference power bus protrusion VSSBD is provided may be referred to as a protrusion area. A part of the touch signal line TSL may be bent in the protrusion area, for example, may be bent from extending along the row direction to extending along the column direction. In this way, the wiring of the touch signal line TSL can be more flexible, which facilitates the selection of a better wiring method according to the needs of the display panel.

In some implementations of the present disclosure, referring to FIG. 2, in the intermediate module, contact pads PAD are distributed into three contact pad groups, namely, a middle contact pad group MPADS located near the middle of the second edge PL2 and two side contact pad groups EPADS that are provided at the left and right ends of the first edge PL1. During the cell test stage, a reference power contact pad used to apply a reference power voltage to the reference power bus VSSB may be located in the side contact pad group(s) EPADS.

In an implementation of the present disclosure, referring to FIG. 1, the reference power wiring segment VSSB1 may include a first line segment VSSBA of the reference power bus, a second line segment VSSBB of the reference power bus, a third line segment VSSBC of the reference power bus and a reference power bus protrusion VSSBD. The first line segment VSSBA of the reference power bus is connected to a reference power pad and extends to the far-end to be electrically connected to the second line segment VSSBB of the reference power bus. The width of the second line segment VSSBB of the reference power bus is greater than the width of the first line segment VSSBA of the reference power bus, and the second line segment VSSBB of the reference power bus extends along the column direction. The third line segment VSSBC of the reference power bus is connected to the far-end of the second line segment VSSBB of the reference power bus and extends along the row direction toward the inner side of the first peripheral area B1 until to be electrically connected with the reference power supplying segment VSSB2. The reference power bus protrusion VSSBD is connected to an inner end of the third line segment VSSBC of the reference power bus, and extends to the inner side of the first peripheral area B1.

Figure 4:
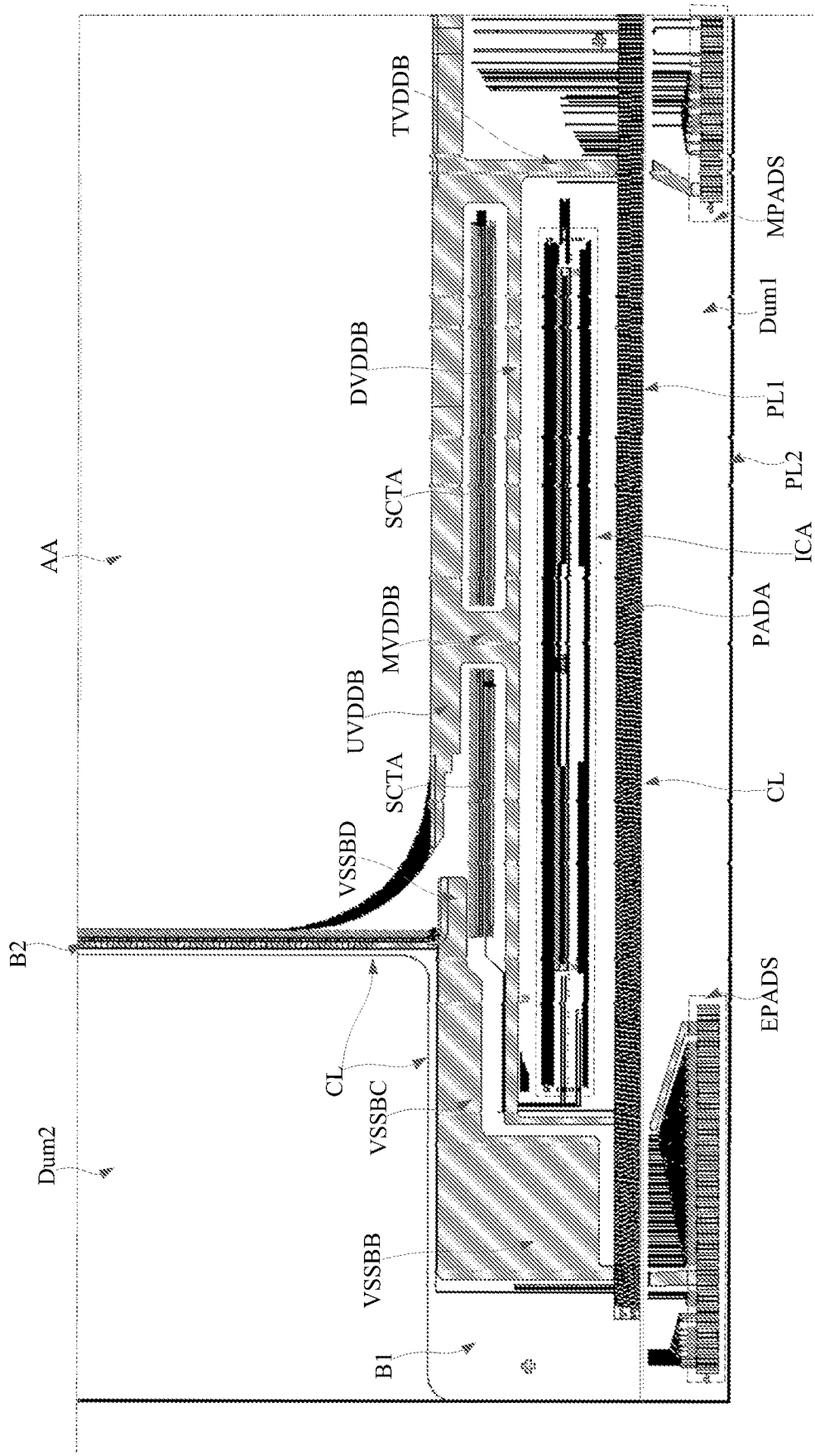
FIG. 4 is an enlarged schematic diagram of a partial structure of a source-drain metal layer at a near-end of an intermediate module in an implementation of the present disclosure.

In one example, referring to FIG. 4, the third line segment VSSBC of the reference power bus has an inner segment and an outer segment. A notch is provided at a side of the inner segment close to the first edge PL1 to avoid the cell test unit CT. The width (dimension along the column direction) of the reference power bus protrusion VSSBD is the same as the width (dimension along the column direction) of the inner segment of the third line segment VSSBC of the reference power bus.

In an example, referring to FIG. 1 and FIG. 4, the outer edge of the second line segment VSSBB of the reference power bus (the outer edge in the row direction) is flushed with the outer edge of the first line segment VSSBA of the reference power bus (the outer edge in the row direction).

In one example, touch signal lines TSL are divided into two groups corresponding to two reference power buses VSSB, and each group of touch signal lines TSL use a corresponding reference power bus VSSB for signal shielding. Touch signal pad(s) connected to each group of touch signal lines TSL is (are) adjacent to a reference power pad connected to the corresponding reference power bus VSSB. For example, each group of touch signal lines TSL overlap with the reference power bus second line segment VSSBB of the corresponding reference power bus VSSB and are connected to corresponding touch signal pad(s); in the pad area PADA, the touch signal pad(s) is (are) located at inner side of the reference power pad.

In an implementation of the present disclosure, a gate driving circuit is provided in the second peripheral area B2 and the fourth peripheral area B4 to apply a signal to at least part of row lines. For example, the gate driving circuit may apply a scan signal to a scan line. The display panel may be provided with a gate driving signal line GOAL in the first peripheral area B1 for applying a control signal to the gate driving circuit, such as a clock line for applying a timing signal to the gate driving circuit, a high-level line for applying a high-level signal, a low-level line for applying a low-level signal, etc. A pad for electrical connection with the gate driving signal line GOAL is provided in the pad area in order to apply a signal to the gate driving circuit.

In one example, along the row direction, a pad electrically connected to the gate driving signal line GOAL in the pad area is located at outer side of the reference power pad.

In one example, the gate driving circuit is located on a side of the reference power supplying segment VSSB2 close to the display area AA.

In some implementations of the present disclosure, referring to FIG. 1, the driving power bus VDDB includes a first part UVDDB of the driving power bus, a third part DVDDB of the driving power bus, and a plurality of second parts MVDDB of the driving power bus. The first part UVDDB of the driving power bus is located between the display area AA and the cell test area CTA. The third part DVDDB of the driving power bus is located at a side of the cell test area CTA away from the display area AA. The cell test area CTA includes a plurality of cell test sub-areas SCTA. The second parts MVDDB of the driving power bus are located among the cell test sub-areas SCTA, and are electrically connected to the first part UVDDB of the driving power bus and the third part DVDDB of the driving power bus. In this way, although the first part UVDDB of the driving power bus shrinks inward and the total length of the first part UVDDB of the driving power bus is reduced, by setting the third part DVDDB of the driving power bus and multiple second parts MVDDB of the driving power bus, the driving power bus VDDB is gridded and the wiring area is increased. On the one hand, this arrangement reduces the overall impedance of the driving power bus VDDB and reduces the voltage drop on the driving power bus VDDB. On the other hand, this arrangement allows the current on the driving power bus VDDB to obtain better uniformity. Further, the first part UVDDB of the driving power bus and the third part DVDDB of the driving power bus included in the driving power bus VDDB both extend along the row direction.

The pads in the pad area include a driving power pad for applying a driving power voltage. The driving power bus VDDB further includes a fourth part TVDDB of the driving power bus located between the first edge PL1 and the third part DVDDB of the driving power bus. An end of the fourth part TVDDB of the driving power bus is electrically connected to a driving power pad, and the other end is electrically connected to the third part DVDDB of the driving power bus. In this way, the third part DVDDB of the driving power bus is electrically connected to the driving power pad through the fourth part TVDDB of the driving power bus. This avoids squeezing the space for the reference power bus protrusion VSSBD when the fourth part TVDDB of the driving power bus is directly connected to the first part UVDDB of the driving power bus. This arrangement can not only ensure that the reference power bus protrusion VSSBD has a relatively large size, but also can ensure that the driving power voltage VDD is effectively applied to the first part UVDDB of the driving power bus.

Correspondingly, in the intermediate module, the contact pad PAD includes a driving power contact pad for applying a driving power voltage. The fourth part TVDDB of the driving power bus also extends outward to be electrically connected to the driving power contact pad. A part of the fourth part TVDDB of the driving power bus beyond the cutting line CL can be removed during the cutting stage.

In an implementation of the present disclosure, driving power pads include side driving power pads respectively located at both ends of the pad area, and include two middle driving power pads located in the middle of the pad area. The number of the fourth parts TVDDB of the driving power bus is four, and the fourth parts TVDDB are electrically connected to four driving power pads, respectively.

Correspondingly, referring to FIG. 2, in the intermediate module, the driving power contact pads include side driving power contact pads respectively located in the two side contact pad groups EPADS, and include two middle driving power contact pads located in the middle contact pad group MPADS.

In one example, a side driving power pad may be located at an inner side of a touch signal pad, so that a reference power pad and a driving power pad are respectively provided on both sides of the touch signal pad to improve the shielding effect on the touch signal pad.

In one example, in the intermediate module, two middle driving power contact pads may be located at both ends of the middle contact pad group MPADS to provide a certain signal shielding effect on other contact pads PAD of the middle contact pad group MPADS.

In one example, the fourth part TVDDB of the driving power bus, which is electrically connected to the side driving power pad, may be electrically connected to the outer end (the outer end along the row direction) of the third part DVDDB of the driving power bus.

In an implementation of the present disclosure, along the row direction, the third part DVDDB of the driving power bus is divided into two power sub-lines. Both ends of a power sub-line are electrically connected with driving power pads through fourth parts TVDDB of the driving power bus. Illustratively, the third part DVDDB of the driving power bus is divided into a left power sub-line and a right power sub-line. The middle driving power pad on the left is electrically connected to an inner end (that is, the right end) of the left power sub-line through a fourth part TVDDB of the driving power bus, and the middle driving power pad on the right is electrically connected to an inner end (that is, the left end) of the right power sub-line through a fourth part TVDDB of the driving power bus. In this way, it can be ensured that the driving power voltage is applied on the third part DVDDB of the driving power bus in a relatively uniform manner, and the current on the third part DVDDB of the driving power bus is relatively uniform.

In an implementation of the present disclosure, referring to FIG. 1, along the row direction DH, the cell test area CTA is divided into four cell test sub-areas SCTA, namely, two side cell test sub-areas SCTA located at both sides and two middle cell test sub-areas SCTA in the middle. A cell test jumper line CTL extending along the row direction is provided between two adjacent cell test sub-areas SCTA. Control signals in the two adjacent cell test sub-areas SCTA are transmitted through the cell test jumper line CTL to ensure signal continuity. Second parts MVDDB of the driving power bus are provided in the gaps among the cell test sub-areas SCTA.

Figure 6:
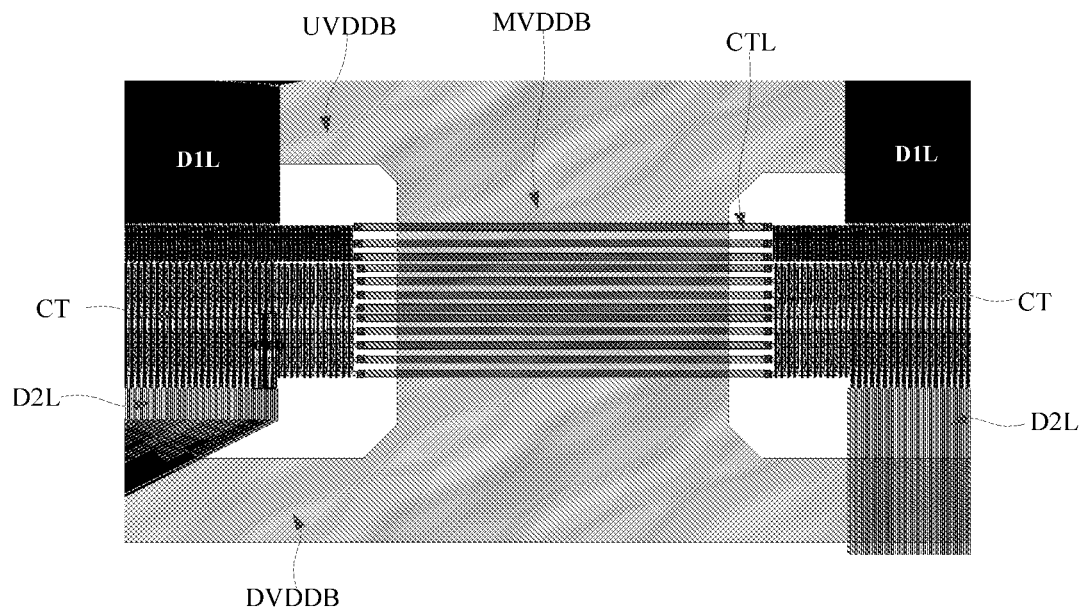
FIG. 6 is a schematic structural diagram of maintaining signal continuity between cell test units through cell test jumper lines in an implementation of the present disclosure.

Referring to FIG. 6, between adjacent cell test sub-areas SCTA, signal lines of the cell test unit CT are connected through cell test jumper lines CTL located in the gate layer. For example, the first gate layer and the second gate layer are used at the same time to realize bridging to avoid the second parts MVDDB of the driving power bus. Also, by bridging the signal lines of the cell test unit CT, the accumulated charge on the cell test unit CT can be dissipated more effectively, avoiding electrostatic breakdown caused by the accumulation of static electricity on the cell test unit CT.

In one example, the gap width (dimension along the row direction) between middle cell test sub-areas SCTA is greater than the gap width between a side cell test sub-area SCTA and a middle cell test sub-area SCTA. Two second parts MVDDB of the driving power bus may be set between the middle cell test sub-areas SCTA. The near-ends of the two second parts MVDDB of the driving power buses are electrically connected to the inner ends of the third part DVDDB of the driving power bus respectively, and the far-ends of the two second parts MVDDB of the driving power buses are electrically connected to the first part UVDDB of the driving power bus respectively. In this way, the degree of gridding of the driving power bus VDDB can be further improved, and the uniformity of the current on the driving power bus VDDB can be improved.

In an implementation of the present disclosure, the length of the first part UVDDB of the driving power bus is smaller than the length of the third part DVDDB of the driving power bus.

In an implementation of the present disclosure, the first peripheral area B1 further includes a driving chip area ICA for bonding a driving chip IC. The driving chip area ICA is located between the third part DVDDB of the driving power bus and the first edge PL1. There are connection lines between the driving chip area ICA and pads, and between the cell test unit CT and a gate driving circuit, so that the driving chip IC interacts with an external circuit through the pads PAD and apply signals to the cell test unit CT and the gate driving circuit.

Figure 5:
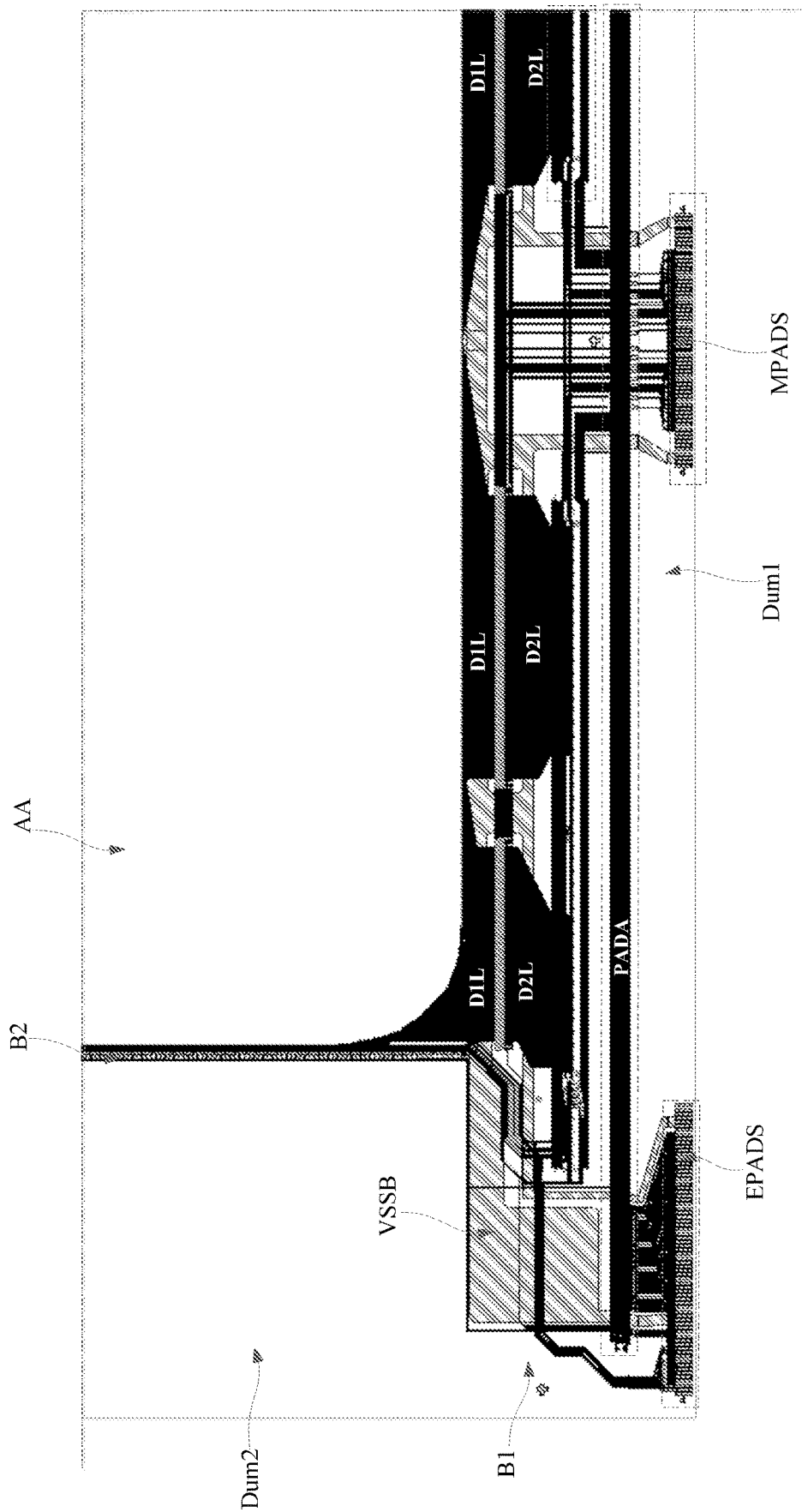
FIG. 5 is a schematic partial structural diagram of some lines of an intermediate module at a near-end in an implementation of the present disclosure.
Figure 7:
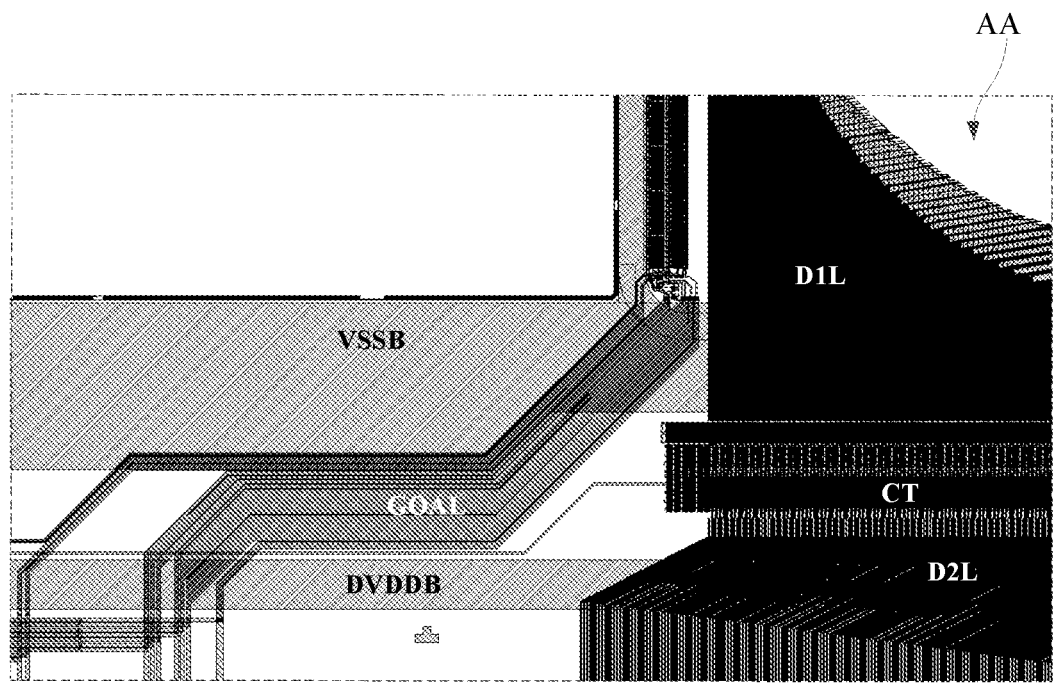
FIG. 7 is a schematic structural diagram showing that a reference power bus protrusion overlaps with a part of a first data interconnection line in an implementation of the present disclosure.

In an implementation of the present disclosure, referring to FIG. 5 and FIG. 7, a second data interconnection line D2L is provided between the cell test area CTA and the driving chip area ICA. The cell test unit CT is electrically connected with the driving chip IC through the second data interconnection line D2L. Optionally, the second data interconnection line D2L is provided in the gate layer to avoid the third part DVDDB of the driving power bus.

In an implementation of the present disclosure, referring to FIG. 3, the driving chip area ICA is divided into at least two sections along the row direction in order to bond multiple driving chips.

Other embodiments of the present disclosure will be readily apparent to those skilled in the art from consideration of the specification and practice of the invention disclosed herein. This application is intended to cover any variations, uses, or adaptations of the present disclosure that follow the general principles of the present disclosure and include common knowledge or customary technical means in the technical field that are not disclosed herein. It is intended that the specification and embodiments are considered as exemplary only, with a true scope and spirit of the present disclosure being indicated by the appended claims.

What is claimed is:

1. A display panel, comprising a display area and a peripheral area surrounding the display area, wherein the peripheral area comprises a first peripheral area located at a side of the display area, the first peripheral area has a cell test area for arranging a cell test unit, the display panel has a first edge, and the first edge is located at a side of the first peripheral area away from the display area;

wherein the display panel is provided with a reference power bus and a touch signal line, and in the first peripheral area, the reference power bus has a reference power bus protrusion, and an orthographic projection of the reference power bus protrusion on the first edge is located within an orthographic projection of the cell test area on the first edge, and at least part of the touch signal line overlaps with the reference power bus protrusion;

wherein the display panel is further provided with a driving power bus in the first peripheral area;

wherein the driving power bus is configured to apply a driving power voltage, the reference power bus is configured to apply a reference power voltage, and the reference power bus is configured to provide the reference power voltage to a common electrode layer in the display panel;

wherein the driving power bus comprises a first part of the driving power bus, a third part of the driving power bus and a plurality of second parts of the driving power bus, and the first part of the driving power bus is located between the display area and the cell test area;

wherein the third part of the driving power bus is located at a side of the cell test area away from the display area;

wherein the cell test area comprises a plurality of cell test sub-areas, the second parts of the driving power bus are located among the cell test sub-areas and are electrically connected to the first part of the driving power bus and the third part of the driving power bus.

2. The display panel according to claim 1, wherein the reference power bus protrusion is located at a side of the cell test unit close to the display area.

3. The display panel according to claim 2, wherein an end of the display area close to the cell test unit has an arc-shaped vertex angle;
wherein the orthographic projection of the reference power bus protrusion on the first edge at least partially overlaps with an orthographic projection of the arc-shaped vertex angle on the first edge.

4. The display panel according to claim 1, wherein the display panel comprises a pixel layer, the pixel layer has a common electrode layer for applying a reference power voltage, and the common electrode layer covers the display area;
wherein an edge of the reference power bus protrusion away from the first edge is located between the display area and an edge of the common electrode layer close to the first edge.

5. The display panel according to claim 1, wherein an area where the reference power bus protrusion is located is a protrusion area, and at least part of the touch signal line is bent in the protrusion area.

6. The display panel according to claim 1, wherein the display panel is provided with a data line in the display area, and a first data interconnection line is provided between the display area and the cell test area;
wherein the data line and the cell test unit are electrically connected through the first data interconnection line;
wherein the reference power bus protrusion overlaps with at least part of the first data interconnection line.

7. The display panel according to claim 1, wherein the display panel is provided with at least one pad arranged along the first edge, and the at least one pad comprises at least one driving power pad for applying a driving power voltage;
wherein the driving power bus further comprises at least one fourth part of the driving power bus, and the third part of the driving power bus is electrically connected to the at least one driving power pad through the at least one fourth part of the driving power bus.

8. The display panel according to claim 7, wherein the at least one driving power pad comprises a plurality of driving power pads corresponding to ends of the third part of the driving power bus, and the at least one fourth part of driving power bus comprises a plurality of fourth parts of the driving power bus corresponding one-to-one to the ends of the third part of the driving power bus;
wherein the ends of the third part of the driving power bus are electrically connected to corresponding driving power pads through corresponding fourth parts of the driving power bus.

9. The display panel according to claim 8, wherein the third part of the driving power bus is divided into two power sub-lines, and an end of each of the power sub-lines is electrically connected with at least one driving power pad through at least one fourth part of the driving power bus.

10. The display panel according to claim 1, wherein a length of the first part of the driving power bus is less than a length of the third part of the driving power bus.

11. The display panel according to claim 1, wherein an orthographic projection of the first part of the driving power bus on the first edge does not overlap with the orthographic projection of the reference power bus protrusion on the first edge.

12. The display panel according to claim 1, wherein the display panel is further provided in the first peripheral area with a driving chip area for bonding a driving chip, and the first part of the driving power bus is provided between the driving chip area and the cell test area.

13. The display panel according to claim 1, wherein the display panel comprises a base substrate, a driving layer, a pixel layer, a thin film encapsulation layer and a touch layer that are stacked in sequence;
wherein the touch signal line is provided in the touch layer;
wherein the driving layer comprises a source-drain metal layer, and the driving power bus and the reference power bus are provided in the source-drain metal layer.

14. A display device, comprising: a display panel;
wherein the display panel comprises a display area and a peripheral area surrounding the display area, the peripheral area comprises a first peripheral area located at a side of the display area, the first peripheral area has a cell test area for arranging a cell test unit, the display panel has a first edge, and the first edge is located at a side of the first peripheral area away from the display area;
wherein the display panel is provided with a reference power bus and a touch signal line, and in the first peripheral area, the reference power bus has a reference power bus protrusion, and an orthographic projection of the reference power bus protrusion on the first edge is located within an orthographic projection of the cell test area on the first edge, and at least part of the touch signal line overlaps with the reference power bus protrusion;
wherein the display panel is further provided with a driving power bus in the first peripheral area;
wherein the driving power bus is configured to apply a driving power voltage, the reference power bus is configured to apply a reference power voltage, and the reference power bus is configured to provide the reference power voltage to a common electrode layer in the display panel;
wherein the driving power bus comprises a first part of the driving power bus, a third part of the driving power bus and a plurality of second parts of the driving power bus, and the first part of the driving power bus is located between the display area and the cell test area;

wherein the third part of the driving power bus is located at a side of the cell test area away from the display area;

wherein the cell test area comprises a plurality of cell test sub-areas, the second parts of the driving power bus are located among the cell test sub-areas and are electrically connected to the first part of the driving power bus and the third part of the driving power bus.

15. The display device according to claim 14, wherein the reference power bus protrusion is located at a side of the cell test unit close to the display area.

16. The display device according to claim 15, wherein an end of the display area close to the cell test unit has an arc-shaped vertex angle;

wherein the orthographic projection of the reference power bus protrusion on the first edge at least partially overlaps with an orthographic projection of the arc-shaped vertex angle on the first edge.

17. The display device according to claim 14, wherein the display panel comprises a pixel layer, the pixel layer has a common electrode layer for applying a reference power voltage, and the common electrode layer covers the display area;

wherein an edge of the reference power bus protrusion away from the first edge is located between the display area and an edge of the common electrode layer close to the first edge.

18. The display device according to claim 14, wherein an area where the reference power bus protrusion is located is a protrusion area, and at least part of the touch signal line is bent in the protrusion area.

19. The display device according to claim 14, wherein the display panel is provided with a data line in the display area, and a first data interconnection line is provided between the display area and the cell test area;

wherein the data line and the cell test unit are electrically connected through the first data interconnection line;

wherein the reference power bus protrusion overlaps with at least part of the first data interconnection line.

* * * * *